Sept. 21, 1948.   L. REICHOLD   2,449,619
SEAL BREAKER FOR COFFEE MAKERS
Filed Aug. 26, 1944

INVENTOR.
LUDWIG REICHOLD.
BY
Louis V. Lucia
ATTORNEY.

Patented Sept. 21, 1948

2,449,619

UNITED STATES PATENT OFFICE 2,449,619

SEAL BREAKER FOR COFFEE MAKERS

Ludwig Reichold, Winsted, Conn., assignor to The Silex Company, Hartford, Conn., a corporation of Connecticut Application August 26, 1944, Serial No. 551,291

4 Claims. (Cl. 99—292)

This invention relates to a seal breaker for coffee makers and more particularly to a device, such as described in my co-pending application Serial No. 528,008, filed March 24, 1944, now Patent No. 2,413,890, for lifting the upper bowl of a vacuum type coffee maker to break a seal between the said upper bowl and a lower bowl to thereby facilitate the removal of said upper bowl from the lower bowl.

It is well known that in coffee makers, particularly in those of the vacuum type wherein a sealing member is commonly used for permitting a vacuum in the lower bowl, it is often very difficult to detach the upper bowl after a coffee brewing operation due to the fact that the vacuum in the lower bowl has caused the sealing member to be drawn tightly within the mouth of said lower bowl. This is particularly true when the upper bowl is hot, which it usually is after the brewing operation, and it cannot, without considerable discomfort, be firmly grasped with the hand to break the seal between the upper and lower bowls so as to permit removal of the upper bowl.

In such coffee makers, it is desirable to have a cover for the lower bowl which is conveniently pivoted upon the handle for said bowl to permit its being moved to and from closing position relative to the mouth of the bowl.

It is an object of this invention, therefore, to provide a simple and inexpensive means, in combination with a coffee maker cover, for applying a lifting force upon the upper bowl to cause breaking of the seal between it and the lower bowl.

A further object of this invention is to provide a lever which is mounted to said handle together with the cover for said upper bowl and which is so constructed that it may be operated by means of said cover.

A still further object of the invention is to provide a novel combination of seal breaker and cover for the upper bowl of a coffee maker which is simple and inexpensive in its construction as well as highly efficient in its operation.

Further objects and advantages of this invention will be more clearly understood from the following description and from the accompanying drawings in which.

Figure 1:
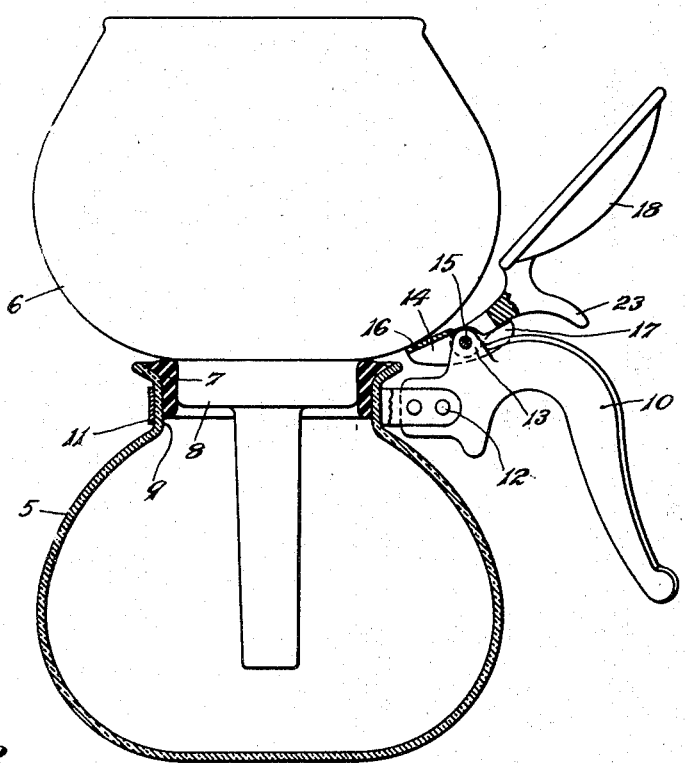
Fig. 1 is a side view partly in central vertical section, of a coffee maker embodying my invention.

As shown in the drawings, the numeral 5 denotes the lower bowl, 6 the upper bowl and 7 a resilient collar, or sealing member, fitting between a depending portion 8 of the upper bowl and the neck 9 of the lower bowl.

A handle 10 is secured to the lower bowl by means of a band 11 which extends around the neck 9 and is attached to the handle with fastening members 12.

In the embodiment of my invention as illustrated, the handle 10 is provided with a projection 13 which extends from the upper portion of the handle and to which is pivotally mounted a lever 14 by means of a pivot 15. This lever has a forward portion 16, which extends under the upper bowl, and portions 17 extending rearwardly of the pivot 15 into operating engagement with the cover 18.

The said lever is preferably constructed of sheet metal and so formed that it has a connecting portion 19 between two parallel side portions 20 which are disposed at opposite sides of the boss 13. The cover 18 has a projection 21 provided with a forked end 22 straddling the lever 14 and whereby the said cover is also pivoted on the boss 13 by the said pivot pin 15.

It will be noted that the portions 17 extend rearwardly a sufficient distance to be engaged by the projection 21 of the handle, as clearly illustrated in Fig. 1, and that the said handle is provided with a thumb engageable extension 23 whereby the said cover and lifting lever 14 may be operated.

In the operation of this invention; when the coffee maker upper bowl is in position over the lower bowl, the lifting lever and cover are in the position illustrated in Fig. 1. When it is desired to lift the upper bowl so as to break the seal between it and the lower bowl, it is simply necessary to press downwardly on the extension 23 with the thumb, while holding the handle 10. This will cause the projection 21 to engage the portions 17 and cause rocking of the lever 14 on the pivot 15 to lift the upper bowl sufficiently to break the seal and thereby permit it to be easily and comfortably lifted off the lower bowl.

It will be noted that when the upper bowl is removed from the lower bowl, the portion 23 may engage the top of the handle 10 and thereby act as a stop for the cover and to prevent the lever 14 from being rocked upwardly too far and to a position wherein it would interfere with the upper bowl while being placed in position upon the lower bowl.

Figure 2:
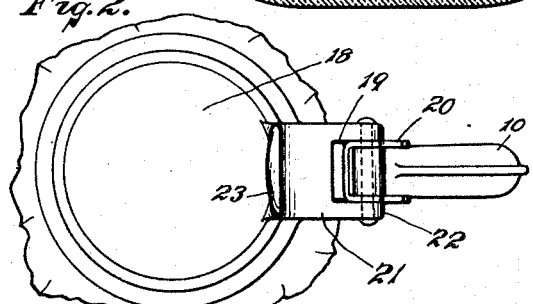
Fig. 2 is a plan view of the upper portion of the lower bowl showing the cover in closed position thereon.
Figure 3:
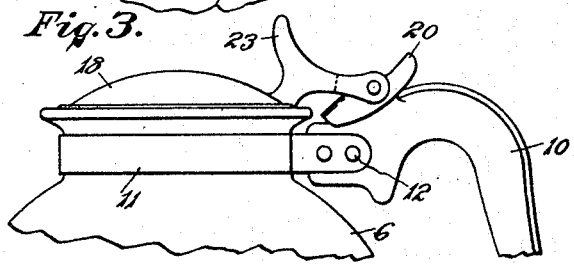
Fig. 3 is a side view thereof in elevation.
Figure 4:
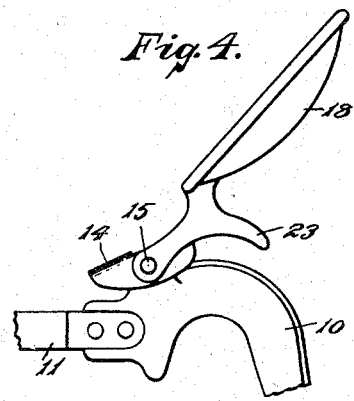
Fig. 4 is a side view in elevation showing the cover in open position.

When the cover is closed over the mouth of the lower bowl, as illustrated in Figs. 2 and 3, it may be operated to open position by means of the projection 23 without interference from the lever 14 which remains inoperative except when it engages the upper bowl.

From the above description, it will be clearly understood that I have provided a novel and economical means for breaking the seal of coffee makers and wherein a cover for the lower bowl and a lever for lifting the upper bowl are both mounted to the handle of said lower bowl by a single pivoting member and in such a manner as to be readily operatable by the thumb.

I claim:

1. For a coffee maker of the character described having a lower and an upper bowl, a handle for said lower bowl having a projection thereon, an inverted U-shaped lever pivotally mounted on said projection with a portion of said lever extending over a portion of said handle and the sides of said lever straddling the said projection and pivotally attached thereto, extensions on said sides, and a cover, movable relative to said lever, pivotally mounted on said projection over the lever and adapted to engage said extensions for operating said lever to raise said upper bowl.

2. For a coffee maker comprising a lower bowl and an upper bowl engaged therewith, a handle carried by the lower bowl, a cover for the lower bowl pivotally mounted on said handle, and means independent of said cover pivotally mounted on the cover pivot and operatable by said cover for moving the upper bowl away from the lower bowl, the said cover being movable independently of said operating means.

3. A coffee maker comprising a lower bowl, an upper bowl, a seal between said upper and lower bowls, a handle on said lower bowl, a projection on said handle, a lever pivotally mounted on said projection and having a portion extending over the top of said handle and forwardly of said pivot for engaging the bottom of said upper bowl, and a cover for said lower bowl mounted on said lever pivot and adapted to move into engagement with the rear end of said lever for the operation thereof.

4. For a coffee maker comprising a lower and an upper bowl, a handle carried by the lower bowl and having an extension, a lever pivotally mounted to said extension by a pivot member with one end extending forwardly to underlie the upper bowl and the other end extending rearwardly to overlie the handle, a cover also pivotally mounted to said extension by said pivot member in overlying relation to the lever, the said cover being pivotally movable independently of said lever and, when rocked on said pivot, being adapted to engage and rock said lever for raising said upper bowl by engagement of the forward end of the lever with the upper bowl, and a projection on said cover providing a thumb piece adapted to be operated for rocking said cover while said handle is held with the hand.

LUDWIG REICHOLD.

REFERENCES CITED

The following references are of record in the file of this patent:

UNITED STATES PATENTS

| Number | Name | Date |
| --- | --- | --- |
| 888,002 | Csincsak | May 19, 1908 |
| 1,080,861 | St. John | Dec. 9, 1913 |
| 2,016,558 | Redrup | Oct. 8, 1935 |
| 2,295,827 | Breen | Sept. 15, 1942 |
| 2,360,569 | Masin | Oct. 17, 1944 |